Oct. 11, 1927.
B. H. URSCHEL
1,644,800
CONNECTER SLEEVE FOR TELESCOPING SHAFTS
Filed Sept. 10, 1926
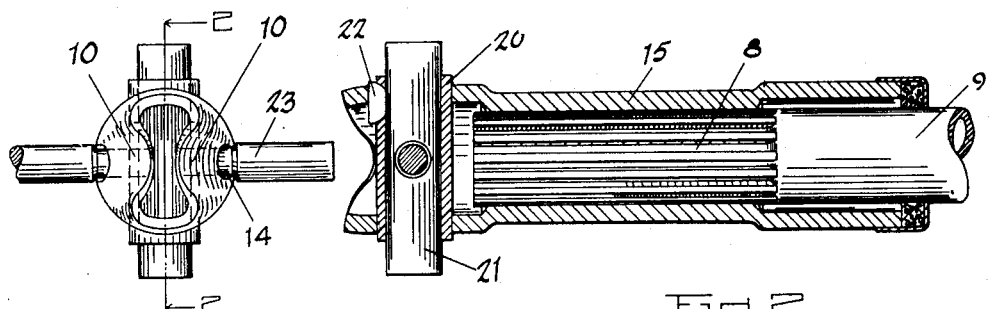
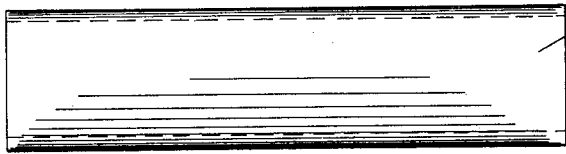
Fig 3
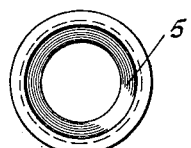
Fig 4
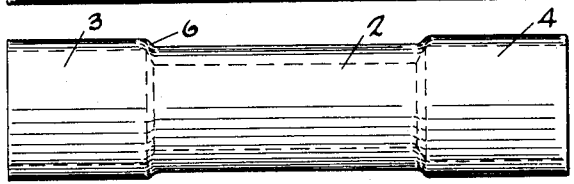
Fig 5
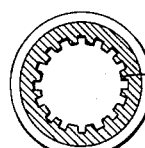
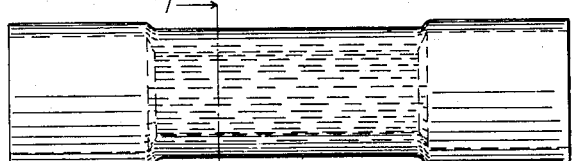
Fig 6
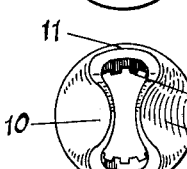
Fig 7
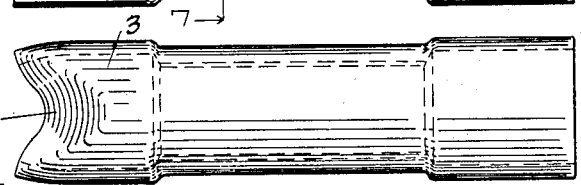
Fig 9
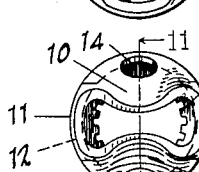
Fig 8
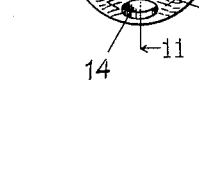
Fig 10
Fig 11
Inventor
Bertis H. Urschel
By Trusat F. Crampton
Attorney Patented Oct. 11, 1927.

1,644,800

UNITED STATES PATENT OFFICE.

BERTIS H. URSCHEL, OF BOWLING GREEN, OHIO.

CONNECTER SLEEVE FOR TELESCOPING SHAFTS.

Application filed September 10, 1926. Serial No. 134,660.

My invention has for its object to provide an improved sleeve of a telescoping connecting shaft of the type commonly used in automobiles that may be made at a low cost of production and yet which is so constructed that it will sustain the strains that are ordinarily produced in such shafts. By reason of my invention steel tubes may be used in forming the sleeve and by swaging may be thickened in parts thereof and not only strengthened thereby but also provide a wall wherein splines may be formed as by broaching.

Ordinarily such sleeves are formed by machining that is, surface cutting to shape and size. By my invention the central portion of the tube is swaged thereby thickening the wall of the body portion of the tube and leaving end portions that have inner and outer diameters that exceed the inner and outer diameters of the body portion. The splines may thus be formed by broaching, the enlarged end portions forming cups for receiving and permitting the delivery of the end of the broach used. Also by my invention I provide a means for increasing the bearing area for the cross pin of the universal joint to which such sleeves are ordinarily connected. A portion of the head or enlarged end of the sleeve is bent so as to surround or extend over the upper side of the cross pin to which the sleeve is connected. A bushing is inserted through the head or end of the sleeve and the three parts namely, the pin, the bushing and the sleeve are keyed together by means of a key that engages the said three parts.

The invention may be contained in sleeve structures used for different purposes. To illustrate a practical application of the invention I have selected the sleeve of a connecting shaft as an example of such structures and shall describe it hereinafter. The structure selected for purposes of illustration is shown in the drawing.

Figure 1 is an end view of the sleeve showing the cross pins of the universal joint. Fig. 2 is a view of a section taken on the plane of the line 2—2 indicated in Fig. 1, and shows the telescoping parts of the shaft. Fig. 3 illustrates a side view of the tube that is cut to the required length to form a sleeve. Fig. 4 is an end view of the sleeve after the central body portion has been swaged to reduce its inner and outer diameters and to increase the thickness of its wall. Fig. 5 is a side view of the tube when it has been swaged. Fig. 6 is a side view of the tube after its splines have been formed therein as by broaching. Fig. 7 is a view of a section taken on the plane of the line 7—7 indicated in Fig. 6. Fig. 8 is an end view of the sleeve when portions of one of its ends have been bent inward. Fig. 9 is a side view of the tube showing one of the surfaces inclined towards the axis of the tube. Fig. 10 illustrates an end view of the completed tube showing a pair of openings for one of the cross pins. Fig. 11 is a view of a section taken on the plane of the line 11—11 indicated in Fig. 10 and illustrates the supporting or contacting surfaces of the inwardly inclined portions of one of the ends or heads of the sleeve.

In forming the connecting sleeve containing my invention, a steel tube is swaged to produce a reduced central or body portion having a thicker wall than the tube had originally and consequently thicker than the walls of the end portions or heads, which are left the same size as the original tube. This is for the purpose of strengthening the tube and so that the major length of the sleeve may be splined for receiving the coacting telescoping member of the connecting shaft. As shown in the drawings, the tube 1 is cut to the desired length and is then swaged along the central portion as at 2, leaving two end portions 3 and 4 and forming shoulders at 5 and 6, one on the inside of the tube and the other on the outside of the tube. Between the shoulders the wall of the tube is thickened by reason of the reduced circumference of this part of the tube.

Splines are formed in this thicker wall as at 7. By reason of the larger ends a spline forming broach may be inserted in the ends and will be guided thereby. Inasmuch as the portion of the tube that is splined terminates short of the end of the tube, a good clean finishing cut may be made at the end of the portion that is splined. The splines 7 register and engage with the splines 8 formed on the exterior of the wall of the other member of the telescoping connecting shaft, namely, the male portion 9 of the shaft.

The end edge of one end portion of the tube, such as, the portion 3 may be forced inward at opposite points and so as to nearly close the said end about as shown in Figs. 1, 8, 10 and 11. This produces four sloping sides all of which are curved, namely, the sides 10 and 11. The sides 10 have portions thereof convex in form as to the exterior of the tube and other portions concave. The concave portion being located between the convex portion of these parts of the end of the tube. The sides 11 are convex and slightly tapered, approximately cone form. The sides are consequently inclined to the axis of the tube and the edges of the sides 10 are located comparatively in close proximity to each other and very much closer than the edges of the sides 11.

The end 3 of the tube is drilled to form holes 12 and in drilling the inwardly inclined sides 10 are cut so as to form cylindrical surfaces 13 that conform to the curvature of the circular openings 12. Holes 14 are also bored through the wall of the end 3 and along a line located in the plane of the line extending through the centers of the holes 12, the said plane being located at right angles to the axis of the sleeve 15. In order to connect the sleeve with the universal joint, a bushing 20 may be inserted in the holes 12 and one of the pins 21 of the universal joint may be inserted in the bushing 20. A key 22 may be located in slots formed in the end 3 of the sleeve and the end of the bushing 20 and in the side of the pin 21. If desired the key 22 may be welded or soldered in position. A cross pin 23 may be inserted through the openings 14 and openings formed in the bushing 20 and the pin 21. The pins may be connected, one with the universal joint ring and the universal joint ring may be connected by means of the other pin with the usual boot which is ordinarily connected with the drive shaft of the mechanism.

Thus my invention provides an exceedingly efficient construction that may be cheaply made and which will sustain the strains of a high rate of vibration while rotatively transmitting power to operate the load to which the connecting shaft is subject to. The inwardly inclined portions of the head greatly increases the bearing area as between the bushing and the sleeve and prevents wearing along the edges of the openings through which the bushing extends which greatly increases the life of the sleeve.

I claim:

1. In a shaft connecter, a sleeve, a central body portion of the sleeve having smaller interior and exterior diameters and a thicker wall than the end portions of the sleeve and forming flaring inner and outer surfaces, the central body portion of the sleeve having splines.

2. In a shaft connecter, a sleeve, one end of the sleeve having portions bent inwardly along lines inclined to the axis of the sleeve, the said end having circular openings extending through opposite sides of the sleeve and the inclined portions having inner lateral surfaces conforming to the curvature of the said openings.

3. In a shaft connecter, a sleeve, one end of the sleeve having portions bent inwardly along lines inclined to the axis of the sleeve, the said end having circular openings extending through opposite sides of the sleeve and the inclined portions having inner lateral surfaces conforming to the curvature of the said openings, a bushing and a pin extending through the said openings and a key for keying the sleeve, the bushing and the pin together.

4. In a shaft connecter, a sleeve, one end of the sleeve having portions bent inwardly along lines inclined to the axis of the sleeve, the said end having circular openings extending through opposite sides of the sleeve and the inclined portions having inner lateral surfaces conforming to the curvature of the said openings, a bushing and a pin extending through the said openings, the said inclined portions substantially covering the outer side of the said bushing.

5. In a shaft connecter, a sleeve, one end of the sleeve having portions bent inwardly along lines inclined to the axis of the sleeve, the said end having circular openings extending through opposite sides of the sleeve and the inclined portions having inner lateral surfaces conforming to the curvature of the said openings, a bushing and a pin extending through the said openings and a key for keying the sleeve, the bushing and the pin together, the said inclined portions having openings and the pin extending through the said last named openings, the bushing and the first named pin.

6. In a shaft connecter, a sleeve, one end of the sleeve having portions bent inwardly, the said end having circular openings extending through opposite sides of the sleeve and between the inclined portions, the inclined portions having inner lateral surfaces inclined to the axis of the sleeve, portions of said inclined surfaces formed cylindrical to form cylindrical bearing surfaces.

7. In a shaft connecter, a sleeve, one end of the sleeve having portions bent inwardly, the said end having circular openings extending through opposite sides of the sleeve and between the inclined portions, the inclined portions having inner lateral cylindrical surfaces, a pin having a cylindrical surface conforming to the cylindrical surface of the inclined portions and extending through the said openings and bearing against the cylindrical surface of the inclined portions.

8. In a shaft connecter, a sleeve, one end of the sleeve having portions bent inwardly, the said portions having inner lateral cylindrical surfaces, a member having a cylindrical surface conforming to the inclined surfaces of the said portions and extending at right angles to the axis of the sleeve and adapted to bear on the cylindrical surfaces of the inclined portions.

9. In a shaft connecter, a sleeve, one end of the sleeve having portions bent inwardly along lines located in the common plane and inclined to the axis of the sleeve, the said end having circular openings extending through opposite sides of the sleeve, the centers of the openings located in a line substantially at right angles to the said plane and the inclined portions having inner lateral surfaces conforming to the curvature of the said openings.

10. In a shaft connecter, a sleeve, one end of the sleeve having portions bent inwardly along lines located in the common plane and inclined to the axis of the sleeve, the said end having circular openings extending through opposite sides of the sleeve, the centers of the openings located in a line substantially at right angles to the said plane, the inclined portions having inner lateral surfaces conforming to the curvature of the said openings, the said end of the sleeve having a second pair of openings, the line of the centers of the second pair of openings located at right angles to, and in the same plane with, the line of the centers of the first pair of openings.

11. In a shaft connecter, a sleeve, one end of the sleeve having portions bent inwardly along lines inclined to the axis of the sleeve and the inclined portions having inner lateral cylindrical surfaces and the inclined portions having openings extending therethrough.

12. In a shaft connecter, a sleeve, one end of the sleeve having portions bent inwardly along lines inclined to the axis of the sleeve, the said end having a pair of circular openings extending through opposite sides of the sleeve and the inclined portions having inner lateral cylindrical surfaces conforming to the curvature of the said openings and in axial alignment of the centers of the said openings.

13. In a shaft connecter, a sleeve, one end of the sleeve having portions bent inwardly along lines inclined to the axis of the sleeve, the said end having a pair of circular openings extending through opposite sides of the sleeve and the inclined portions having inner lateral cylindrical surfaces conforming to the curvature of the said openings and in axial alignment with the centers of the said openings, the said end having a second pair of openings extending through opposite sides of the sleeve, the line of the centers of the second pair of openings located at right angles to the line connecting the centers of the first pair of openings.

14. In a shaft connecter, a sleeve, one end of the sleeve having portions bent inwardly along lines inclined to the axis of the sleeve, the said end having a pair of circular openings extending through opposite sides of the sleeve and the inclined portions having inner lateral cylindrical surfaces conforming to the curvature of the said openings and in axial alignment with the centers of the said openings, the said end having a second pair of openings extending through the inclined portions, the line of the centers of the second pair of openings located at right angles to and in the same plane with the line of centers of the first pair of openings.

15. In a shaft connecter, a sleeve, one end of the sleeve having portions bent inwardly along lines inclined to the axis of the sleeve, the said end having a pair of circular openings extending through opposite sides of the sleeve and the inclined portions having inner lateral cylindrical surfaces conforming to the curvature of the said openings and in axial alignment of the centers of the said openings, the said end having a second pair of openings extending through the inclined portions, the line of the centers of the second pair of openings located at right angles to and in the same plane with the line of centers of the first pair of openings, the second pair of openings having a diameter smaller than the first pair of openings.

In testimony whereof I have hereunto signed my name to this specification.

BERTIS H. URSCHEL.